United States Patent [19]
Sodini et al.

[11] 4,148,928
[45] Apr. 10, 1979

[54] METHOD FOR THE EXTRACTION OF UNDESIRABLE AND/OR TOXIC GLUCOSIDIC COMPOUND FROM VEGETABLES

[75] Inventors: Giancarlo Sodini; Marco Canella, both of Rome; Alberto Patricelli, Mentana, all of Italy

[73] Assignee: Snamprogetti S.p.A., Milan, Italy

[21] Appl. No.: 802,567

[22] Filed: Jun. 1, 1977

[30] Foreign Application Priority Data

Jul. 2, 1976 [IT] Italy ................................ 24985 A/76

[51] Int. Cl.$^2$ ............................................. A23L 1/20
[52] U.S. Cl. ........................................ 426/430; 536/4; 426/640
[58] Field of Search ................... 426/429, 430; 536/1, 536/4

[56] References Cited
U.S. PATENT DOCUMENTS 3,732,202  5/1973  Jewers et al. ............................ 536/4

*Primary Examiner*—Raymond N. Jones
*Assistant Examiner*—Robert J. Warden
*Attorney, Agent, or Firm*—Morgan, Finnegan, Pine, Foley & Lee

[57] ABSTRACT

A method id disclosed for extracting from vegetable substances, especially seeds and seed flour, toxic substances of a glucosidic nature, such as for example simmondsin from jojoba seed flour. An organic solvent (or more organic solvents) containing at least one polar group is combined with an acidic electrolyte in aqueous solution and the extraction is carried out at room temperature and can be repeated. The contents of simmondsin thus drops from about 3% to 750 parts per million approx.

5 Claims, No Drawings

METHOD FOR THE EXTRACTION OF UNDESIRABLE AND/OR TOXIC GLUCOSIDIC COMPOUND FROM VEGETABLES

This invention relates to a method for extracting toxic glucosidic compounds and compounds having a similar chemical structure under conditions which are non-degradative proteins.

The presence of a few toxic glucosidic compounds, such as the cyanogenetic glucosides and the thioglucosides, does not permit the use, for alimentary purpose, of extraction flours which contain such compounds. As a matter of fact, animals fed with diets based on colza, jojoba, carthamus flours and on flours of other vegetables have exhibited toxic and intolerance phenomena upon ingestion of such products.

Among the several toxic glucosides present in the vegetables, a cyanogenetic glucoside, simmondsin, has recently been isolated from the jojoba seeds (C. A. Elliger et al., 1973, J. Chem. Soc., 2209, Perkin Transaction I). Such compound causes in the animals fed with diets which contain jojoba flours an aversion for food and anorexia even to death (Products from jojoba: a promising new crop for arid lands, National Academy of Sciences, Washington, D.C. 1975, 25).

The method according to the present invention is an exhaustive extraction from seeds, cakes, flours, proteic isolates and concentrates of all those compounds which belong to the class of glucoside, the presence of which in the vegetable products makes the latter objectionable for human feed.

The method uses one or more solvents of organic nature, in admixture, which contain at least a polar group: such a solvent or solvent mixture must contain, in addition, an aqueous solution of an electrolyte having an acidic nature, selected from among the organic or inorganic acids or the acidic salts of such acids. The extraction is carried out within a temperature interval ranging from 4° C. to the temperature at which the denaturation of the proteins begins, with a final ratio of flour to solvent of from 1:3 to 1:160 and using an extraction pH ranging from 2.0 to 6.0.

To illustrate the method in detail reference will be had as the present description proceeds, to the extraction of the 2-cyanomethylene-3-hydroxy-4,5-dimethoxycyclohexyl-beta-D-glucoside (Simmondsin), contained in the seeds of jojoba plants (*Simmondsia chinensis*).

It is apparent that such a method can be applied with advantage to either seeds or vegetable flours which contain toxic glucosidic compounds having a similar structure or which are anyhow soluble in the solvent mixture used in the present method.

Further details will become apparent in the examples which are given for a better understanding of the invention, which, however, are not to be construed as limitations of the present invention.

In the actual practice, the following materials have been used and the procedures indicated hereinafter have been followed.

MATERIALS

The cyanoglucoside "simmondsin" (2-cyanomethylene-3-hydroxy-4,5-dimethoxycyclohexyl-beta-D-glucoside) has been purified from jojoba seeds in accordance with the method of C. A. Elliger et al., 1973, J. Chem. Soc., 2209, Perkin Transaction J. (98% purity).

Nor-butyl alcohol, nor. heptane and 99% formic acid were supplied by Carlo Erba as RPE products (RPE=Pure Erba Reagent).

METHODS

Simmondsin (2-cyanomethylene-3-hydroxy-4,5-dimethoxy-cyclohexyl-beta-D-glucoside) was determined by dosing, upon hydrolysis, the cyanide ion contained thereon according to the method A.O.A.C. (Association Official Analytical Chemists 26.113–26.114, 12th Edition, 1975) by carrying out the hydrolysis in an acidic environment, by sulphuric acid, instead of a neutral aqueous method as reported in the above indicated method.

The macro-Kjekdahl method was used for the determination of nitrogen and the value of proteic nitrogen has been obtained by multiplying the total nitrogen by 6.25. Moisture and crude fiber have been dosed according to the standard procedures of A.O.A.C. (12th Edition, 1975).

The extraction solvent for the simmondsin was formed by a solution of nor.butyl alcohol containing 0.1-normal formic acid in the ratio of 92/8 (volume, volume). This ratio is not to be taken as a limitation.

Dehulled jojoba seeds were ground using a Sörvall omnimixer in the presence of nor.heptane in the ratio flour to solvent of 1:5 (weight/volume) and the extraction of the fatty substances was completed with nor. heptane in a Soxhlet during 5 hours. The flour, dried in a nitrogen stream and finely ground, with a Bühler mill at setting No. 2, was added to the extraction solvent in the ratio of 1 to 15 (weight/volume). The extraction was carried out at room temperature for 30 minutes with stirring, the pH of the suspension being maintained at the constant value of 4.5 by additions of 0.5-normal formic acid.

The suspension was filtered in a vacuo on a Büchner funnel, using Whatman No. 3 filter paper. The extraction was repeated on the residue with fresh solvent many times in the manner described above. On completion of the extraction runs, the flour was dried in a nitrogen stream and on this material the dosage of the residual cyanide ion was effected, along with the determinations of moisture, proteins and crude fiber with the above indicated methods.

PREPARATION OF PROTEIC ISOLATES

The flour coming from the simmondsin extraction process was subjected to the protein solubilization process in an alkaline environment by a single-stage extraction.

A portion of flour which had previously been treated with an acidic butanolic solution was slurried in 15 parts of water, brought to a pH of 10.0 with 0.2-normal NaOH (flour to solvent ratio 1:15, weight to volume) and stirred for 30 minutes at 25° C.

The suspension was centrifuged at 17,000 rpm for 20 minutes with a Sörvall RB-2 centrifugal machine with the rotor SS-34. A second extraction is repeated on the residue under the same conditions.

The two supernatant liquors are combined and the proteins are precipitated with 0.5-normal hydrochlorid acid to the isoelectric point.

The precipitate is sedimented by centrifugation at 17,000 rpm for 20 minutes and then washed with an aqueous acidic solution.

The proteic precipitate is taken up in an aqueous medium, neutralized to pH 7.0, freeze-dried and chemically analyzed.

EXAMPLE 1

Extraction of the 2-cyanomethylene-3-hydroxy-4,5-dimethoxy-cyclohexyl-D-glucoside (simmondsin) contained in the defatted jojoba flour (*Simmondsia chinensis*)

Initial flour composition:

| | |
|---|---|
| Moisture | 7.4% |
| On the dry substance: | |
| Proteins | 29.1% |
| Crude fiber | 8.27% |
| Simmondsin (dosed as cyanide ion) | 2.71% |

100 grams of flour are added in a flask to 1,500 mls solvent, the latter being nor.butanol and 0.1-normal formic acid in the ratio of 92:8 (volume by volume). The extraction is carried out with stirring at room temperature for 30 minutes, the pH being maintained at the constant value of 4.5 by small incremental additions of 0.5-normal formic acid. The suspension is filtered in a vacuo on a Büchner funnel on Whatman No. 3 filter paper and, on the residue, the extraction is repeated with 1,500 additional mls of fresh solvent.

This treatment is sequentially repeated for a total of eight extraction runs.

The resultant product, dried in a nitrogen stream, has the following composition:

| | |
|---|---|
| Moisture | 11.9% |
| On the dry substance: | |
| Proteins | 35.6% |
| Crude fiber | 11.0% |
| Simmondsin (as cyanide ion) | 746 parts per million |

Such a product, on account of its low simmondsin contents is adapted for the preparation of proteinic concentrates and isolates for alimentary uses.

EXAMPLE 2

Preparation of proteinic isolates from jojoba flour treated as in Example 1:

Initial composition of the flour:

| | |
|---|---|
| Moisture | 11.9% |
| On the dry substance: | |
| Proteins | 35.6% |
| Crude fiber | 11.0% |
| Simmondsin (as cyanide ion) | 760 parts per million |

20 grams of flour are slurried in 300 mls of an aqueous alkaline solution at pH 10 (ratio of flour to solvent 1:15, weight to volume) for 30 minutes with stirring at 25° C. The pH of the slurry is maintained at the constant value of 10.0 during the entire extraction time by adding a 0.5-normal NaOH solution.

The slurry is centrifuged at 17,000 rpm for 20 minutes and the residue is re-extracted under the above described conditions.

The two proteinic solutions are combined and precipitated with 0.5-normal hydrochloric acid at a pH of 4.3: the precipitate is separated by centrifugation at 17,000 rpm during 20 minutes, washed with acidulated water of pH 4.3, reslurried in water and finally freeze-dried.

The thusly obtained product has the following compositions:

| | |
|---|---|
| Moisture | 6.3% |
| On the dry substance: | |
| Proteins | 83.1% |
| Crude fiber | 0.2% |
| Simmondsin (as cyanide ion) | 190 parts per million |

Such a product, due to its low residual contents of simmondsin and its proteinic contents can be used as a food product.

We claim:

1. A method for the extraction of glucosidic compounds from seeds and seedflours which contain them, said process consisting in treating the latter with an organic solvent containing at least one polar group together with an aqueous solution of an electrolyte having an acidic nature selected from organic or inorganic acids or the acidic salts of such acids.

2. A method according to claim 1 characterized in that the operation is carried out with a final ratio of the solute to the solvent ranging from 1:3 to 1:160.

3. A method according to claim 1 characterized in that the operation is carried out in the presence of an aqueous solution of electrolyte at a pH ranging from 2 to 6.

4. A method according to claim 1 characterized in that the operation is carried out at a temperature ranging from 4° C. to the temperature at which the denaturation of the proteins begins.

5. A method for the extraction of simmondsin from defatted jojoba flour said method comprising contacting defatted jojoba with an extracting liquid which comprises a mixture of n-butanol and formic acid to extract the simmondsin and thereoften isolating the defatted jojoba flour.

* * * * *